Jan. 5, 1954 W. A. HUMPHREY ET AL 2,665,148
VACUUM CLEANER END CLOSURE AND DUSTING
TOOL CONVERTER COUPLING THEREFOR
Filed Oct. 30, 1946 3 Sheets-Sheet 1

INVENTORS.
Warren A. Humphrey
Dale C. Gerber
BY
Harry S. Dumark
ATTORNEY.

INVENTORS.
Warren A. Humphrey
Dale C. Gerber
BY
Harry S. Bueart
ATTORNEY.

Patented Jan. 5, 1954

2,665,148

UNITED STATES PATENT OFFICE 2,665,148

VACUUM CLEANER END CLOSURE AND DUSTING TOOL CONVERTER COUPLING THEREFOR

Warren A. Humphrey, Canton, and Dale C. Gerber, North Canton, Ohio, assignors to The Hoover Company, North Canton, Ohio, a corporation of Ohio Application October 30, 1946, Serial No. 706,748

1 Claim. (Cl. 285—169)

This invention relates to suction cleaners and more particularly to means for connecting a dusting tool hose to the end caps of a tank type suction cleaner.

According to this invention both the suction end cap and the blower end cap are provided with a socket for swivelly receiving a coupling member secured to the end of the flexible hose. The side walls of the socket are cut away to receive the sides of a normally oval shaped wire clamp member and a coupling member is provided with a shoulder adapted to move behind the sides of the wire whereby the coupling member is swivelly secured in the socket. Both the socket and coupling member are preferably of tapered formation whereby the sides of the wire clamp are distended by the mere insertion of the coupling member into the socket and the coacting tapered portions will form a seal with each other. The lower end of the wire clamp member is held rigidly with respect to the socket and a slidable manually operable member is carried by the end cap above the socket and is attached to the upper end of the wire clamp whereby depression of the slidable member will distend the sides of the wire clamp whereby the coupling member may be easily released from the socket.

According to another feature of this invention an ejecting sleeve is telescoped with relation to that portion of the coupling member which carries the shoulder and is spring biased to extended position whereby the coupling member will be automatically ejected when the wire clamp is released.

Other objects and advantages of this invention will become apparent as the description proceeds when taken in connection with the accompanying drawings in which.

Figure 1:
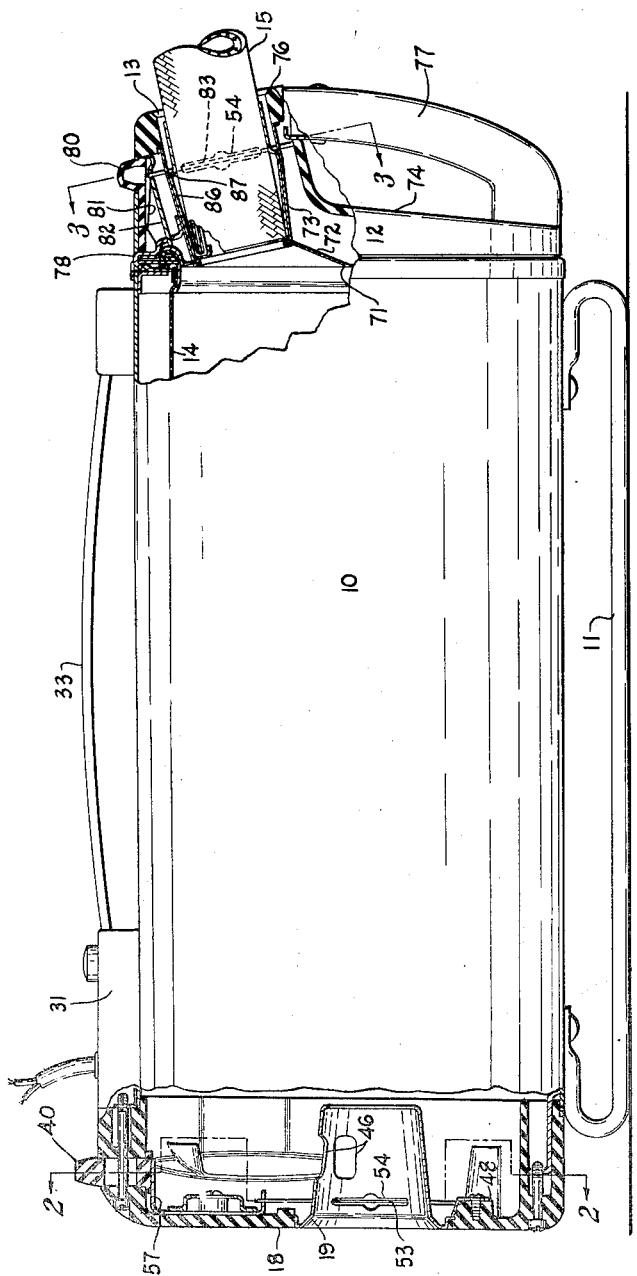
Figure 1 is a side view of a suction cleaner showing a coupling according to this invention applied to both the suction end cap and the blower end cap.

Referring to the drawings the coupling of this invention is shown applied to both the blower end and suction end cap of a suction cleaner in the form of a casing 10 mounted for transitory movement on runners 11. The casing 10 is provided with a removable suction end cap 12 to provide access to a filter 14 within the casing 10. The end cap 12 is provided with a suction opening 13 for receiving one end of the suction hose 15 connected at its opposite end to a suitable cleaning tool.

The casing 10 is also provided with a blower end cap 18 having a socket 19 for interchangeably receiving a coupling member attached to the hose 15 as will be explained hereinafter. The usual switch 31 for controlling the operation of the motor and a carrying handle 33 is mounted on top of the casing 10.

The end cap 12 comprises a metallic plate 71 having a forwardly extending depressed portion 72, to which is secured a conical socket member 73 positioned at an angle immediately rearwardly of the suction opening 13, an appearance casing 74 preferably of a phenolic condensation product having a forwardly extending protuberance 76 in which the suction opening 13 is formed, and a carrying handle 77 suitably secured to the lower side of the covering 74 and the protuberance 76.

The suction end cap 12, at its upper edge, is provided with a hook 78 receivable in a suitable socket in the suction end of the casing 10 for securing the upper side of the end cap 12 to the casing 10. The lower side of the end cap 12 is detachably secured to the casing 10 by a releasable latch mechanism of any suitable character.

Figure 3:
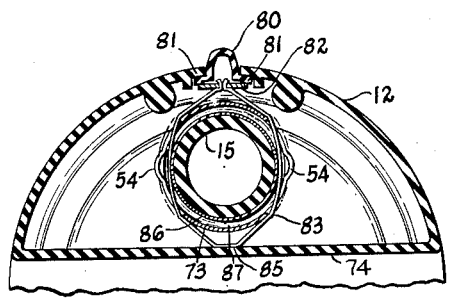
Figure 3 is an inclined vertical sectional view of the suction end cap taken on line 3—3 of Fig. 1 and looking in the direction of the arrows.

The socket member 73 has vertically extending slots 54 cut in its sides to receive the side wires of a wire clamp member 83 normally maintained in oval shape, as shown in full lines of Fig. 3, by its own resiliency. At its lower end the wire clamp 83 is rigidly held by resting at 85 against the forwardly extending wall of the appearance cover 74. At its upper end the wire clamp 83 is attached to a lever 82 having its rear end pivoted to the hook 78 and its forward end positioned to be contacted by the lower surface 81 of a manually actuatable button 80 reciprocably mounted in the top of the end cap 12.

Attached to the hose 15 in any suitable manner is a coupling member 86, of tapered formation, to seal in the socket 73 when in engaged position. A shoulder 87 is provided on the coupling member 86 in such a position as to be engaged by the sides of the clamp spring 83 when the coupling member 86 is inserted into the socket.

Movement of the coupling member 86 into the socket 73 will cause the tapered part thereof to automatically distend the sides of the wire clamp 83 until the shoulder 87 moves behind the sides of the wire clamp member to engage behind them. Depression of the button 80 will depress the upper end of the clamp wire 83 so as to distend its sides, to the dotted line position of Fig. 3, whereby the coupling member 86 may be readily removed.

The socket 19 of the blower end cap 18 is substantially the same as the socket 73 and of tapered formation to seal with the coupling member 86 except that additional air exit openings 46 are provided for reducing the back pressure when the coupling member 86 is not in use.

A clamp wire 53 similar to the clamping wire 83 has its sides extending through vertical slots 54 in the sides of the socket 19. The lower end of the clamping wire 53 is anchored to the end cap 18 by one of the lugs 48 which are utilized to secure the socket 19 to the end cap. The upper ends of the wire clamp 53 are suitably attached to a member 57 slidably secured to the inner surface of the end cap 18 by means of a clamping plate 59. At its upper end the member 57 is suitably secured to a manually actuatable button 40 in the top side of the end cap 18. The button 40 is mounted for vertical sliding movement by a pin and slot connection with one of the bolts which is used to secure the end cap 18 to the casing 10. Depression of the button 40 will distend the sides of the wire clamp 53 to the dotted line position of Fig. 2 whereby the sides of the clamping wire 53 will be disengaged from shoulder 87 and permit the coupling member 86 to be released from the socket 19.

Figure 2:
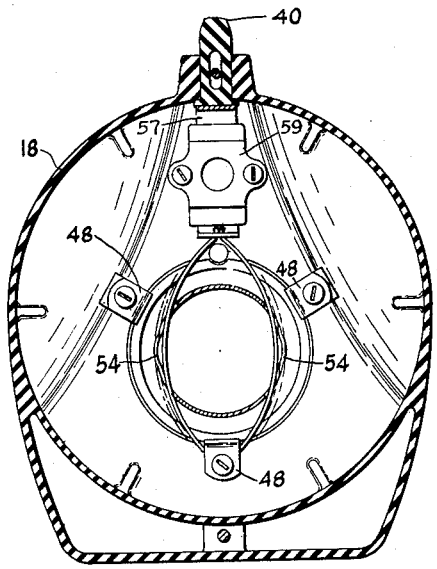
Figure 2 is a transverse vertical sectional view of the blower end cap taken on line 2—2 of Fig. 1 and looking in the direction of the arrows.

According to this invention the coupling member 86 of Figs. 1 to 3, inclusive, may be provided with a telescoping sleeve, spring biased in such a manner that when the wire clamps 53 or 83 are released the coupling member will be automatically ejected from the sockets.

Figs. 4 to 7, inclusive, show two modifications of such a construction. The socket and latching members of these modifications are substantially the same as that previously described in connection with Figs. 1 to 3, inclusive, but for the purposes of disclosure have been given new reference characters because the construction is slightly different.

Figure 4:
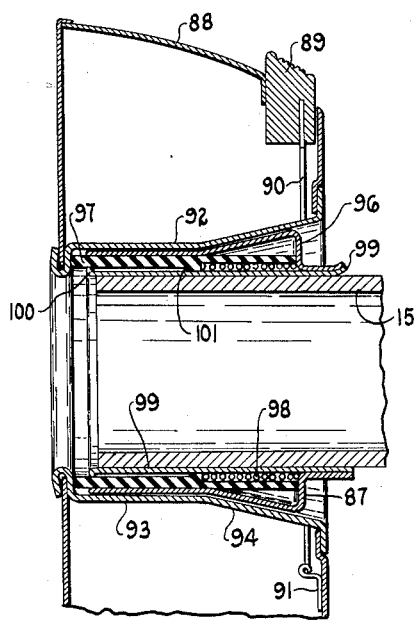
Figure 4 is a longitudinal vertical sectional view of a coupling according to this invention showing a spring pressed ejecting sleeve applied thereto.
Figure 6:
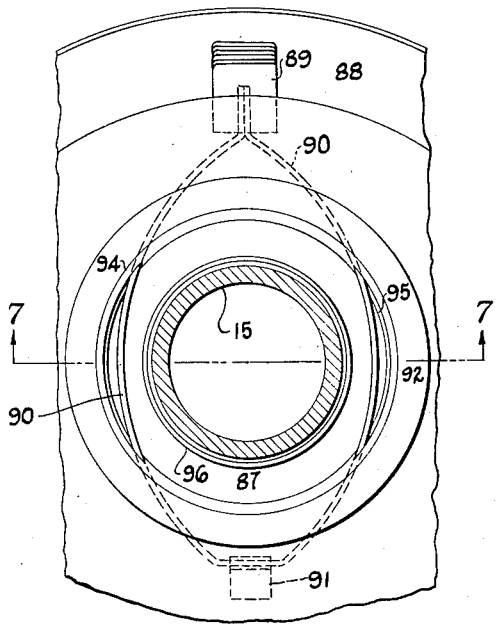
Figure 6 is a front plan view of the socket member of Figs. 4 and 5 with a modified form of coupling member therein.

Figs. 4 and 6 show a slightly modified construction of the socket and clamping wire. Socket member 92 has a cylindrical portion 93 and a conical portion 94 and is slotted at 95 to receive the side wires of the clamping wire 90. The bottom end of the wire 90 is secured at 91 to an end cap 88 which may be either a suction or blower end cap. A manually actuatable button 89 is secured to the upper end of the wire clamp 90 and is mounted for reciprocatory movement in the upper side of the end cap 88 whereby depression of the button 89 will spread the sides of the wire clamp 90 outwardly of the slots 95.

Figure 5:
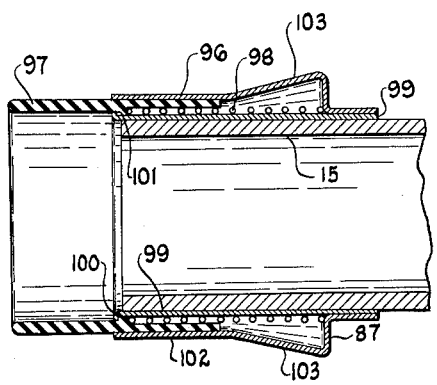
Figure 5 shows the coupling member of Fig. 4 in extended position.

In Figs. 4 and 5 the coupling member comprises a sleeve 96 having a cylindrical portion 102 and a conical portion 103 interfitting with the cylindrical and conical portions of the socket 92 and a shoulder 87 with which the sides of the wire clamp 90 engage. A sleeve 99 is suitably secured to the hose 15 and to the coupling member 96 so as to form a space therebetween. In the space thus formed is a compression spring 98 and a reciprocating sleeve 97 made of any suitable material such as a thermoplastic, hard rubber, or a phenolic condensation product. At its inner end the sleeve 99 has an outturned flange 100 which cooperates with an inwardly projecting annular shoulder 101 substantially midway of the length of the sleeve 97 to limit the extension of the sleeve 97 under the action of the spring 98 which abuts against the other edge of the shoulder 101 and against the inner wall of the shoulder 87 of the coupling member 96.

The parts are normally in the position shown in Fig. 5. Insertion of the coupling member 96 into the socket 92 will cause the rear end of the sleeve 97 to engage the shoulder at the rear of the cylindrical portion 93 of the socket 92 to telescope it relative to the coupling member 96 and sleeve 99 against the action of the spring 98. At the same time the conical surface 103 will engage the sides of the wire clamp 90 and distend them until they engage behind the shoulder 87.

Subsequent depression of the knob 89 will spread the sides of the wire clamp 90 to disengage them from the shoulder 87. The spring 98 will then automatically force the coupling member 96 out of the socket in an obvious manner.

Figure 7:
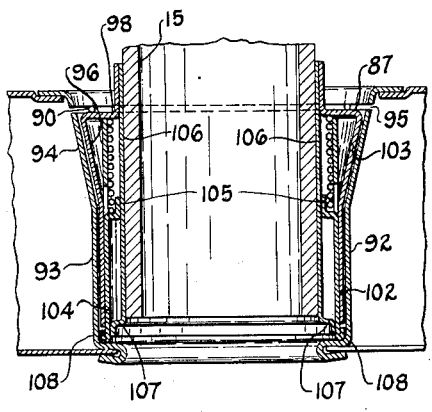
Figure 7 is a longitudinal cross-sectional view on line 7—7 of Fig. 6 and looking in the direction of the arrows.

The coupling of Figs. 6 and 7 differs over that of Figs. 4 and 5 only in that the sleeve 97 is replaced by a metallic sleeve 104 having an inturned flange 105 which cooperates with outturned flange 107 on sleeve 106 to limit the outward extension of the sleeve 104 under the action of the spring 98 which in turn acts between the flange 105 and the shoulder 87. A rolled over end 108 on sleeve 104 abuts against the inner end of the socket 92 to compress the spring upon inward telescoping movement of the sleeves 104 and 106. The operation is substantially the same as that of Figs. 4 and 5.

From the foregoing it can be seen that this invention provides a suction cleaner in which both the suction end cap and the blower end cap are provided with a socket member for receiving a coupling attached to a flexible hose in which the coupling member is merely inserted into the socket so as to distend a clamping wire so that the coupling member is automatically securely attached to the end cap and is permitted swiveling movement relative thereto. In order to remove the coupling member from either end cap it is merely necessary to press a slidable button whereby the sides of the wire clamp are distended to release the coupling member.

While we have shown but a number of modifications of our invention it is to be understood that these modifications are to be taken as illustrative only and not in a limiting sense. We do not wish to be limited to the particular structure shown and described but to include all equivalent variations thereof except as limited by the scope of the claim.

We claim:

In a suction cleaner having a casing and an end closure therefor, coupling means for detachably connecting a cleaning tool hose to said end closure comprising, a socket member carried by said end closure and having a conical sealing portion, said socket member having slits extending entirely through its side walls near one end of said conical portion, a spring wire surrounding said socket member at said slits and normally stressed to take an elongated shape with its side portions biased to lie in said slits interiorly of said socket member and its end portions extending above and below said socket member between said slits, a coupling member attached to one end of said hose, said coupling member having a conical sealing portion for cooperation with the conical sealing portion of said socket member and an annular shoulder positioned to lie behind and against the portions of said wire positioned interiorly of said socket member when said conical portions are in cooperative engagement, one of said end portions being anchored to said end cap and manually actuatable means extending beyond the periphery of and carried by said end closure and engaging the other end portion of said spring wire to move said other end portion toward said anchored end portion so as to move the side portions thereof which are normally positioned interiorly of said socket member outwardly of said slits to remove them from behind said shoulder.

WARREN A. HUMPHREY.
DALE C. GERBER.

References Cited in the file of this patent

UNITED STATES PATENTS

| Number | Name | Date |
| --- | --- | --- |
| 407,671 | Leland | July 23, 1889 |
| 925,959 | Smith | June 22, 1909 |
| 1,176,205 | Cutlip | Mar. 21, 1916 |
| 1,369,687 | Martin | Feb. 22, 1921 |
| 1,770,669 | Martinet | July 15, 1930 |
| 2,052,967 | Carlstedt | Sept. 1, 1936 |
| 2,182,343 | Lofgren | Dec. 5, 1939 |
| 2,240,543 | Brown | May 6, 1941 |
| 2,254,611 | Lofgren | Sept. 2, 1941 |
| 2,260,712 | Harrison | Oct. 28, 1941 |
| 2,287,474 | Hansson | June 23, 1942 |
| 2,326,439 | Clements | Aug. 10, 1943 |

FOREIGN PATENTS

| Number | Country | Date |
| --- | --- | --- |
| 844,214 | France | July 20, 1939 |
| 563,190 | Great Britain | Aug. 2, 1944 |